United States Patent
Kaplinger et al.

(10) Patent No.: US 9,716,771 B2
(45) Date of Patent: *Jul. 25, 2017

(54) CACHE CONTROL FOR WEB APPLICATION RESOURCES

(71) Applicant: International Business Machines Corporation, Armonk, NY (US)

(72) Inventors: Todd E. Kaplinger, Raleigh, NC (US); Christopher C. Mitchell, Raleigh, NC (US); Gregory L. Truty, Austin, TX (US); Jianjun Zhang, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/096,771

(22) Filed: Apr. 12, 2016

(65) Prior Publication Data

US 2016/0226994 A1    Aug. 4, 2016

Related U.S. Application Data

(63) Continuation of application No. 14/687,537, filed on Apr. 15, 2015, now Pat. No. 9,325,633, which is a
(Continued)

(51) Int. Cl.
*G06F 15/167* (2006.01)
*H04L 29/08* (2006.01)
(Continued)

(52) U.S. Cl.
CPC ...... *H04L 67/2842* (2013.01); *G06F 17/3089* (2013.01); *G06F 17/30902* (2013.01); *H04L 47/78* (2013.01); *H04L 67/02* (2013.01)

(58) Field of Classification Search
USPC ....... 709/203, 217, 206, 213, 219, 223, 224, 709/226, 228, 231, 232; 715/781;
(Continued)

(56) References Cited

U.S. PATENT DOCUMENTS 7,886,218 B2  2/2011  Watson
7,904,562 B2  3/2011  Takase et al.
(Continued)

FOREIGN PATENT DOCUMENTS

CN  101523393 A  9/2009
CN  101529415 A  9/2009
(Continued)

OTHER PUBLICATIONS

"SOLrConfigXML," [online] Apache Solr Wiki, Jun. 22, 2012 [retrieved Jun. 28, 2012] retrieved from the Internet: <http://wiki.apache.org/solr/SolrConfigXml>, 14 pgs.
(Continued)

*Primary Examiner* — Quang N Nguyen
(74) *Attorney, Agent, or Firm* — Cuenot, Forsythe & Kim, LLC (57) ABSTRACT

Cache control for Web application resources can include receiving a cache manifest for a Web application, wherein the cache manifest specifies a Web page of the Web application, and determining, using a processor, a resource that is required by the Web page. A closure collection can be built that includes the resource required by the Web page. A reference to the resource can be written to the cache manifest.

16 Claims, 3 Drawing Sheets

Related U.S. Application Data continuation of application No. 13/538,225, filed on Jun. 29, 2012, now Pat. No. 9,037,662, which is a continuation of application No. 13/537,605, filed on Jun. 29, 2012, now Pat. No. 9,043,469.

(51) Int. Cl.
*G06F 17/30* (2006.01)
*H04L 12/911* (2013.01)

(58) Field of Classification Search
USPC .............................................. 717/178; 726/3
See application file for complete search history.

(56) References Cited

U.S. PATENT DOCUMENTS

| | | | |
|---|---|---|---|
| 9,037,662 B2 | 5/2015 | Kaplinger et al. | |
| 9,043,469 B2 | 5/2015 | Kaplinger et al. | |
| 9,325,633 B2 | 4/2016 | Kaplinger et al. | |
| 9,331,957 B2 | 5/2016 | Kaplinger et al. | |
| 2005/0251563 A1* | 11/2005 | Berranger | H04M 3/487 709/217 |
| 2006/0031778 A1* | 2/2006 | Goodwin | G06F 8/38 715/781 |
| 2008/0086477 A1 | 4/2008 | Hawkins et al. | |
| 2008/0104195 A1 | 5/2008 | Hawkins et al. | |
| 2008/0155016 A1* | 6/2008 | Tsai | H04L 67/2842 709/203 |
| 2011/0055683 A1 | 3/2011 | Jiang | |
| 2011/0238746 A1 | 9/2011 | Chess et al. | |
| 2012/0084835 A1* | 4/2012 | Thomas | G06F 17/30867 726/3 |
| 2012/0102221 A1 | 4/2012 | Grieve | |
| 2012/0202221 A1 | 8/2012 | Leroy | |
| 2012/0311020 A1* | 12/2012 | Brown | G06F 12/0862 709/203 |
| 2013/0219383 A1* | 8/2013 | Hilerio | G06F 8/65 717/178 |
| 2014/0006539 A1 | 1/2014 | Kaplinger et al. | |
| 2014/0006622 A1 | 1/2014 | Kaplinger et al. | |
| 2015/0154313 A1 | 6/2015 | Zong et al. | |
| 2015/0222565 A1 | 8/2015 | Kaplinger et al. | |
| 2015/0222724 A1 | 8/2015 | Kaplinger et al. | |
| 2016/0226993 A1 | 8/2016 | Kaplinger et al. | |

FOREIGN PATENT DOCUMENTS

| | | |
|---|---|---|
| CN | 102375882 A | 3/2012 |
| CN | 103530306 A | 1/2014 |

OTHER PUBLICATIONS

U.S. Appl. No. 13/537,605, Non-Final Office Action, Apr. 21, 2014, 9 pg.
U.S. Appl. No. 13/537,605, Final Office Action, Sep. 16, 2014, 11 pg.
U.S. Appl. No. 13/537,605, Notice of Allowance, Jan. 21, 2015, 10 pg.
U.S. Appl. No. 13/538,225, Non-Final Office Action, Apr. 28, 2014, 13 pg.
U.S. Appl. No. 13/538,225, Final Office Action, Sep. 19, 2014, 11 pg.
U.S. Appl. No. 13/538,225, Notice of Allowance, Jan. 12, 2015, 11 pg.
U.S. Appl. No. 14/687,469, Non-Final Office Action, Sep. 11, 2015, 13 pg.
U.S. Appl. No. 14/687,469, Notice of Allowance, Jan. 11, 2016, 9 pg.
U.S. Appl. No. 14/687,469, Supplemental Notice of Allowance, Mar. 28, 2016, 2 pg.
U.S. Appl. No. 14/687,537, Non-Final Office Action, Sep. 21, 2015, 15 pg.
U.S. Appl. No. 14/687,537, Notice of Allowance, Jan. 21, 2016, 15 pg.
U.S. Appl. No. 14/687,537, Supplemental Notice of Allowance, Mar. 28, 2016, 2 pg.
U.S. Appl. No. 15/095,945, Non-Final Office Action, Aug. 16, 2016, 13 pg.

\* cited by examiner

CACHE CONTROL FOR WEB APPLICATION RESOURCES

BACKGROUND

A Web application generally refers to an application that is implemented as a collection of Web pages that operate in a cooperative manner over a network. A Web application can be built using a variety of different types of resources such as Cascading Style Sheets (CSS), JavaScript®, HyperText Markup Language (HTML), image files, and the like. The performance of the Web application is dependent upon many factors including, for example, the organization and interaction of these various resources when executed.

BRIEF SUMMARY

One or more embodiments disclosed within this specification relate to cache control for Web application resources.

An embodiment can include a method. The method can include generating a cache manifest for a Web application, wherein the cache manifest specifies a Web page of the Web application, and determining, using a processor, a resource that is required by the Web page. The method can include building a closure collection including the resource required by the Web page and writing a reference indicating the resource to the cache manifest.

Another embodiment can include a method. The method can include deploying a first component of a Web application to a first data processing system. The first component can include a content cache specifying a list of resources and a closure collection that includes each resource in the list of the content cache. The method also can include deploying a second component of the Web application to a second data processing system. The second component includes at least a portion of the Web application not included in the first component.

Another embodiment can include a system. The system can include a processor configured to initiate executable operations. The executable operations can include generating a cache manifest for a Web application, wherein the cache manifest specifies a Web page of the Web application, determining a resource that is required by the Web page, and building a closure collection including the resource required by the Web page. A reference indicating the resource can be written to the cache manifest.

Another embodiment can include a system. The system can include a first data processing system storing a first component of a Web application. The first component can include a content cache specifying a list of resources and a closure collection including each resource in the list of the content cache. The system further can include a second data processing system communicatively linked with the first data processing system via a network. The second data processing system can store a second component of the Web application. The second component includes at least a portion of the Web application not included in the first component.

Another embodiment can include a computer program product. The computer program product can include a computer readable storage medium having stored thereon program code that, when executed, configures a processor to perform executable operations. The operations can include generating a cache manifest for a Web application, wherein the cache manifest specifies a Web page of the Web application, determining a resource that is required by the Web page, and building a closure collection including the resource required by the Web page. A reference indicating the resource can be written to the cache manifest.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to cache control for Web application resources. In accordance with the inventive arrangements disclosed within this specification, the resources that are utilized by a Web application can be evaluated to distinguish those resources that are required from those resources that are not required. One or more of the required resources can be included within a closure collection. A cache manifest for the closure collection can be generated and/or updated that lists the contents of the closure collection.

The Web application can be configured, e.g., separated, into two or more different components. A first component can include the closure collection and the cache manifest. A second component can include one or more portions, e.g., any remaining portions, of the Web application not included within the first component. By configuring the Web application as two or more components, the Web application can be deployed to a network that utilizes edge server technology. The servers within the network can analyze the Web application and move the first component of the Web application to a server that is closer, in terms of distance, hops of the network, or another metric, to the user or users that will be accessing the Web application. The remaining components can be stored elsewhere in other servers of the network until needed.

In this manner, the Web application can be served to a user in an efficient manner since portions of the Web application, e.g., the first component including those portions accessed by users with a high degree of frequency, are already stored on a server that is close to the user. The distance of the server to the user results in faster response times for the user and improved performance of the Web application. Other portions of the Web application, e.g., the second component, can be stored in one or more other servers at locations that are geographically farther from the user than the server storing the first component.

As used within this specification, a "Web application" refers to an application that is formed using one or more Web technologies such as HyperText Markup Language, HyperText Transfer Protocol (HTTP), JavaScript®, etc. A Web application includes one or more Web pages. In one aspect, each Web page of a Web application is an HTML file. It should be appreciated that while a Web application can be operated over a public network such as the Web (e.g., the Internet), a Web application also can operate over a private network.

Figure 1:
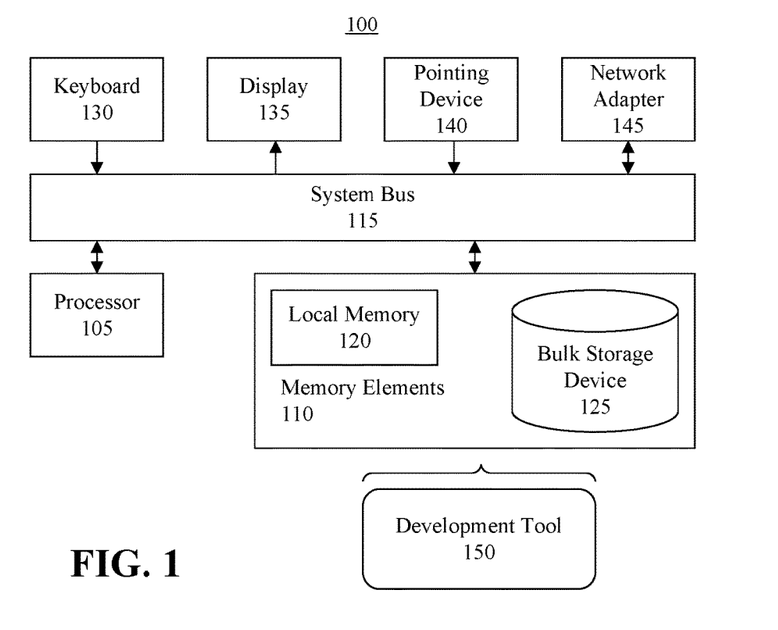
FIG. 1 is a block diagram illustrating a system for cache control of Web application resources in accordance with an embodiment disclosed within this specification.

FIG. 1 is a block diagram illustrating a system 100 for cache control of Web application resources in accordance with an embodiment disclosed within this specification. As illustrated, system 100 can include at least one processor 105 coupled to memory elements 110 through a system bus 115 or other suitable circuitry. Accordingly, system 100 can store program code within memory elements 110. Processor 105 can execute the program code accessed from memory elements 110 via system bus 115.

In one aspect, system 100 is implemented as a data processing system, such as a computer, that is suitable for storing and/or executing program code. It should be appreciated, however, that system 100 can be implemented in the form of any system including a processor and memory that is capable of performing the functions and/or operations described within this specification.

Memory elements 110 can include one or more physical memory devices such as, for example, local memory 120 and one or more bulk storage devices 125. Local memory 120 refers to RAM or other non-persistent memory device(s) generally used during actual execution of the program code. Bulk storage device(s) 125 can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to system 100. The I/O devices can be coupled to system 100 either directly or through intervening I/O controllers. One or more network adapters 145 also can be coupled to system 100 to enable system 100 to become coupled to other systems, computer systems, remote printers, and/or remote storage devices through intervening private or public networks. Modems, cable modems, and Ethernet cards are examples of different types of network adapters 145 that can be used with system 100.

As pictured in FIG. 1, memory elements 110 can store development tool 150. Development tool 150, being implemented in the form of executable program code, can be executed by system 100 and, as such, is considered part of system 100. Execution of development tool 150 configures system 100 to perform and/or initiate the executable operations described within this specification relating to cache management of Web application resources.

Figure 2:
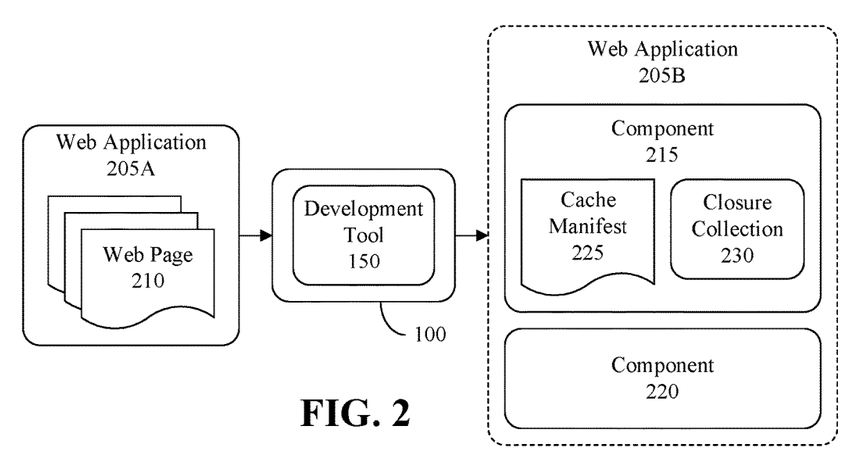
FIG. 2 is a block diagram illustrating operation of the system described with reference to FIG. 1 in accordance with another embodiment disclosed within this specification.

FIG. 2 is a block diagram illustrating operation of system 100 as described with reference to FIG. 1 in accordance with another embodiment disclosed within this specification. Like numbers will be used to refer to the same items throughout this specification. As shown, system 100 is executing development tool 150.

In one embodiment, system 100 receives a Web application 205A. Web application 205A includes one or more Web pages 210. In one aspect, Web application 205A can be provided to system 100 in the form of a Web Application Archive (WAR) file or in another container or format. In general, system 100 processes Web application 205A and generates a modified version illustrated as Web application 205B. System 100, for example, can introspect Web application 205A to generate Web application 205B as described within this specification.

Web application 205B is functionally equivalent to Web application 205A. Whereas Web application 205A can be viewed as a single, monolithic structure or component, Web application 205B includes a first component 215 and a second component 220. The dashed lines corresponding to Web application 205B in FIG. 2 indicate that while components 215 and 220, taken collectively, represent Web application 205B, each of components 215 and 220 is separate and distinct.

As shown, component 215 includes a cache manifest 225 and a closure collection 230. In one embodiment, system 100 generates cache manifest 225 and closure collection 230. In one exemplary implementation, cache manifest 225 is implemented in accordance with the Offline Web Applications, W3C Working Group Note, dated May 30, 2008 (W3C specification). For example, cache manifest 225 can be implemented as described in section 3 entitled "Offline Application Caching APIs". In the W3C specification, referring to section 3, a "manifest" attribute can be used. The "manifest" attribute can take a Universal Resource Identifier (URI) that specifies a list of files to be included within closure collection 230.

The W3C specification is one example of a format that can be used and/or followed in implementing cache manifest 225. It should be appreciated, however, that any of a variety of formats and/or protocols can be used. Accordingly, use of the W3C specification as an exemplary implementation of cache manifest 225 is not intended as a limitation of the one or more embodiments disclosed within this specification.

In one aspect, a developer, e.g., a human being, can manually prime cache manifest 225 by adding one or more entries for Web pages 210 of Web application 205A. In another aspect, system 100 can automatically determine one or more Web pages 210 of Web application 205 for which an entry is added to cache manifest 225. In a primed state, whether primed manually or automatically by system 100, cache manifest 225 specifies, e.g., includes a reference to, one or more Web pages 210 of Web application 205A.

A reference to a Web page 210 of Web application 205A can be specified within cache manifest 225 in any of a variety of different ways. For example, a reference to a Web page can be specified as a pathname, a file name, a URI, or the like. Specifying a Web page 210 within cache manifest 225 indicates that the Web page is to be included in closure collection 230 and component 215 of Web application 205B. In the primed state, cache manifest 225 does not specify any resources that are required for the Web pages specified therein. Rather, cache manifest 225 specifies only a list of one or more Web pages 210 of Web application 205A.

In one embodiment, the list of Web pages 210 that primes cache manifest 205 is not a comprehensive list that includes each Web page 210 of Web application 205A. The list of Web pages 210 with which cache manifest 225 is primed is a subset of the entire set of Web pages 210 forming Web application 205A.

Once cache manifest 225 is primed, or in a primed state, system 100 undertakes an evaluation of cache manifest 225 and identifies resources that are used or required by the Web page(s) 210 listed in cache manifest 225. System 100 retrieves each resource that is identified and stores the resource within closure collection 230. System 100 further adds an entry into cache manifest 225 for each resource that is stored within closure collection 230. Cache manifest 225 ultimately specifies a list of resources that are considered required for operation the particular ones of Web pages 210 specified within cache manifest 225 and which are also stored within closure collection 230.

In one embodiment, closure collection 230 is a container that includes the various resources that have been retrieved according to primed cache manifest 225. Examples of containers can include archive files, packages, compressed archive files, Web archives, or the like. The particular type of container that is used to store resources in the form of closure collection 230 is not intended as a limitation of the one or more embodiments disclosed within this specification. Rather, any of a variety of available container and/or file types can be used.

When system 100 completes processing, Web application 205A is transformed into Web application 205B, which includes component 215 and component 220. Component 215 includes closure collection 230 and cache manifest 225. Cache manifest 225 specifies each resource that has been stored within closure collection 230. In one aspect, cache manifest 225 specifies each resource placed in closure file 230 in relation to the particular Web page from which the resource was determined.

Accordingly, Web application 205B can be released in the form to two separate and distinct components 215 and 220. Each of components 215 and 220 can be implemented as any of the various container types described. As such, when Web application 205B is deployed, component 215 can be deployed to a first server while component 220 is deployed to a second and different server. The first server can be located a distance from a client accessing Web application 205B that is smaller than the distance between the client and the second server. As noted, distance can be measured in terms of geographic distance, network distance (e.g., hops or the like), or using another metric.

Accordingly, those resources of Web application 205B that are included within component 215 can be delivered to requesting clients more efficiently than those included in component 220. Resources within component 220 can be stored in a server at a location that is farther from the client and which may be less expensive to utilize. Further, by reducing the amount of data for Web application 205B that is stored on the first server, which may be an expensive or "in-demand" server, the server can store additional resources and/or Web applications.

Figure 3:
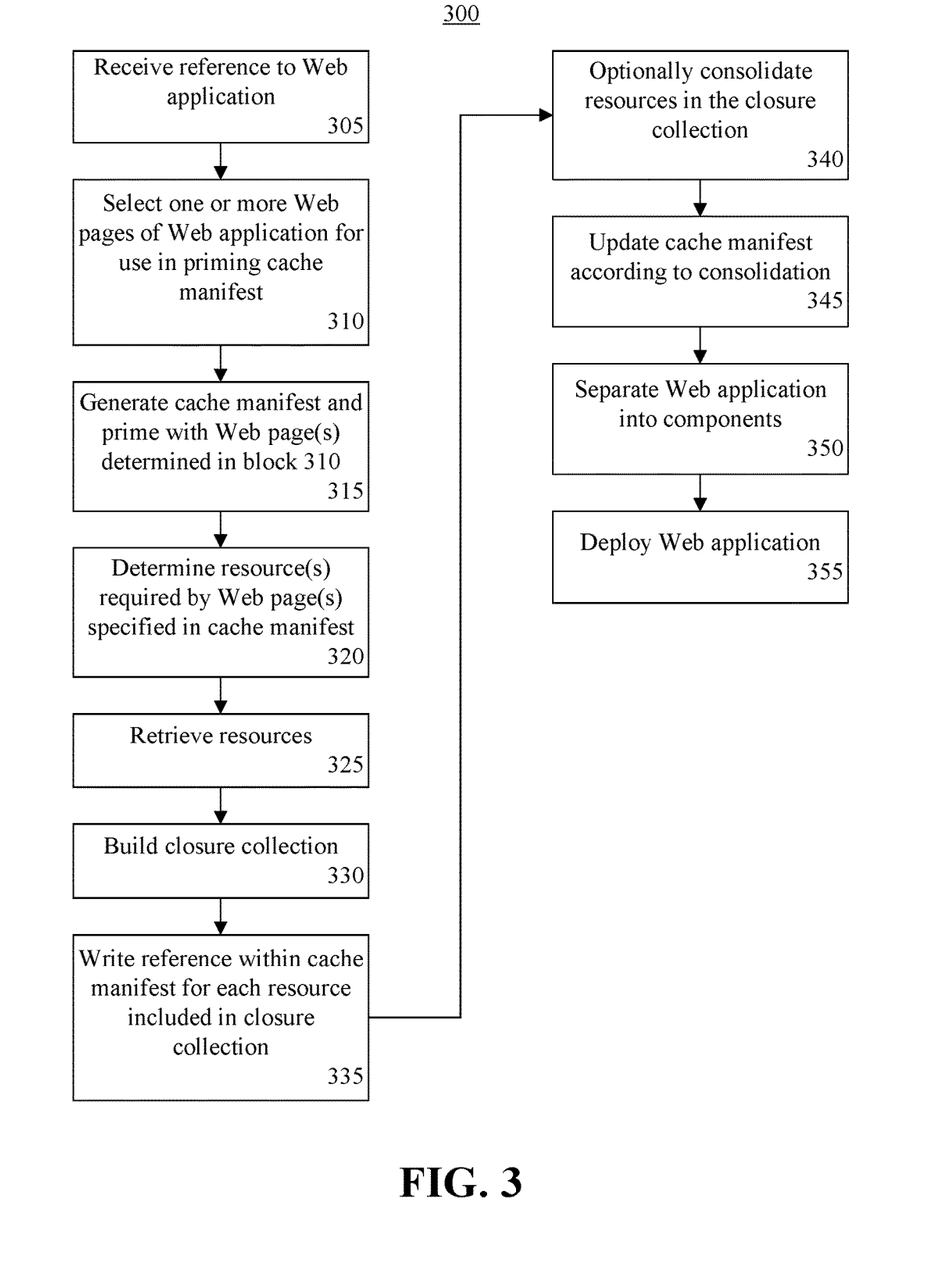
FIG. 3 is a flow chart illustrating a method of operation for cache control of Web application resources in accordance with another embodiment disclosed within this specification.

FIG. 3 is a flow chart illustrating a method 300 of operation for cache management of Web application resources in accordance with another embodiment disclosed within this specification. Method 300 can be implemented by a system as described with reference to FIGS. 1 and 2 of this specification.

In block 305, the system can receive a reference to a Web application. For example, a developer can provide the system with a reference to a Web application or otherwise identify a Web application to the system for processing. In block 310, the system can determine one or more Web pages of the Web application that are to be used in priming a cache manifest to be generated by the system.

As discussed, in one embodiment, the developer can manually specify one or more Web pages that are to be used to prime the cache manifest. For example, the developer can select Web pages that he or she has determined will likely be accessed by users with greater frequency than other Web pages. In illustration, a home Web page or index Web page of the Web application can be selected while an administrative Web page or a help Web page of the Web application may not be selected.

In another embodiment, the system can inspect the Web application and automatically select one or more Web pages that are used to prime the cache manifest that is to be generated. For example, the system can select Web pages having a particular file name such as "index," "main," or the like. The system can maintain a list of file names or other criteria that can be used to evaluate Web pages of the Web application. Any Web page matching the enumerated criteria can be selected. This allows a developer to use a particular naming convention or other attributes during development to designate, or otherwise distinguish, those Web pages to be used to prime the cache manifest from those Web pages that are not to be selected.

In block 315, the system can generate the cache manifest and prime the cache manifest with the Web page(s) selected in block 310. In doing so, the system inserts, or adds, a reference to each of the Web page(s) selected in block 310 within the cache manifest.

In block 320, the system can determine resources that are required by the Web pages specified within the primed cache manifest. The system can determine resources that are required by the Web pages using any of a variety of different techniques.

In one embodiment, the system determines that any resources accessed by a Web page listed in the cache manifest that are static are required resources. A static resource is a file that does not change over time. A dynamic resource refers to a resource that does change over time. An example of a dynamic resource is data that is obtained from a Web service or other function such as a database query or the like. The data changes according to the parameters of the query performed, the time the query is performed, etc. Dynamic resources specified by a Web page listed in the primed cache manifest are not considered required resources.

In one aspect, the system can determine resources by detecting resources indicated by target attributes, e.g., targets, within the HTML of the Web pages with which the cache manifest is primed. Examples of static resources that can be detected as targets can include CSSs, image files, and the like. The detection of such static resources can be performed through an analysis of URIs, using recursive analysis, or the like. In some cases, when a target is identified, the system can determine whether the target is dynamic or static according to the type of the file which can be indicated by the extension of the file.

In the case of JavaScript® files being detected as static resources, for example, an in-depth analysis is required. The system can be configured to understand the syntactical and semantic references to JavaScript® resources within the application source code. For instance, in the case of a popular Ajax (Asynchronous JavaScript and XML) toolkit called "Dojo Toolkit," when the statement "dojo.require( )" is used in JavaScript source code, such a reference indicates that a separate "js" file is required. The system can identify the ".js" file.

The examples illustrated above are provided for purposes of illustration. The system can be configured to identify various programmatic structures that may be included within, or specified by, a Web page listed in the primed cache manifest as indicators of required files. As such, the particular examples provided are not intended as limitations of the one or more embodiments disclosed within this specification.

In block 325, the system can retrieve the resources that are identified in block 320. The system can download or copy the resources, for example. In block 330, the system can build the closure collection. The system can include each of the resources that were retrieved in block 325 within the closure collection. For example, when retrieving a resource, the resource can be stored or written to the closure collection. Thus, the closure collection includes only required, e.g., static, resources and excludes dynamic resources utilized by the Web pages with which the cache manifest is primed.

In block 335, the system can write a reference for each resource included in the closure collection to the cache manifest. In one aspect, the references that are written within the cache manifest can be associated with the particular Web page from which the corresponding resource was identified. For example, if Web page A is specified in the primed cache manifest, and resource A is determined to be required for Web page A and stored within the closure collection, the system writes a reference specifying resource A within the cache manifest. The reference to resource A written to the cache manifest is associated with Web page A to indicate that the resource is required by Web page A.

In block 340, the system optionally can consolidate resources that are in the closure collection. Consolidation can be performed for text-based files, for image files, or the like. In the case of text based files, for example, two or more different files can be consolidated into a single file. The resulting consolidated file has the same functionality as the two or more individual files that were consolidated or merged.

In the case of two or more image files, the image files can be merged into a single image file. For example, two or more images that are displayed concurrently by a Web page and that are proximate or adjacent to one another can be consolidated into a single image, e.g., a composite. The resulting consolidated image file visually appears, when rendered as part of the Web page, the same as the two or more individual image files would have appeared prior to consolidation when displayed.

One example of a consolidation function is the "minify" function. The minify function refers to an available function that combine multiple files, e.g., CSS or JavaScript files, into a single file. The minify function also can remove unnecessary characters from the resulting file (e.g., whitespace and comments), and further can apply compression encoding.

Consolidating resources within the closure collection can further enhance the performance of the Web application. One result of consolidation is that the closure collection includes a smaller number files that need to be cached. Another result is that the size of the closure collection is reduced. In one aspect, consolidation also includes compressing one or more of the resources in the closure collection, or the closure collection as a whole, to reduce the size of the closure collection. Consolidation also makes the cache manifest easier to maintain as fewer entries are included as described in block 345 to follow. Though not illustrated in FIG. 3, it should be appreciated that in consolidating files, any internal reference within the Web application to a consolidated resource also can be updated to indicate, or point to, the consolidated file that includes the resource.

In block 345, the system can update the cache manifest according to any consolidation that is performed in block 340. In particular, any references to resources that are included in the cache manifest that have been consolidated can be replaced with a reference to the consolidated file. Where, for example, the cache manifest included one reference to resource A, a reference to resource B, a reference to resource C, and a reference to resource D, the four references are removed and replaced with a single reference to the consolidated resource (i.e., the consolidated resource into which resources A, B, C, and D were merged).

In block 350, the system can separate the Web application into two or more components. The first component, for example, includes the closure collection and the cache manifest. The second component includes any portions of the Web application not included in the first component. For example, the second component can include any Web pages of the Web application not specified within the cache manifest. The second component may or may not include resources, e.g., static resources, utilized by the Web pages included therein.

In block 355, the Web application can be deployed. The Web application can be deployed, e.g., stored, on one or more servers for hosting. In one aspect, the first component is deployed to a first server, while the second component is deployed to a second and different server.

Figure 4:
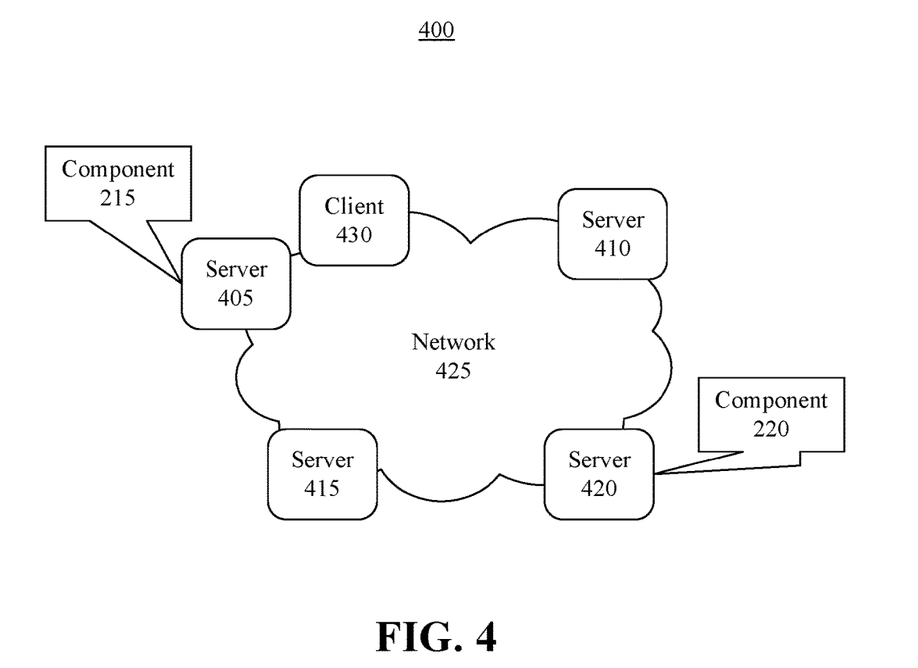
FIG. 4 is a block diagram illustrating a communication system in which a Web application separated into components is hosted in accordance with another embodiment disclosed within this specification.

FIG. 4 is a block diagram illustrating a communication system 400 in which a Web application separated into components is hosted in accordance with another embodiment disclosed within this specification. As shown, communication system 400 includes servers 405, 410, 415, and 420, each being coupled by a network 425. A client 430 also can be coupled to any one of servers 405-420 via network 425.

Each of servers 405-420 and client 430 can be implemented as a data processing system as previously described within this specification. While servers 405-420 and client 430 generally can be implemented as computer systems, client 430 may also be implemented as a portable computing system, a mobile device, or the like.

Network 425 represents any of a variety of communication networks or a combination of two or more communication networks coupled together. For example, network 425 can be implemented as, or include, a WAN, a LAN, a wireless network, a mobile network, the Internet, or various combinations thereof, to which data processing systems (e.g., mobile devices, communication devices, computers, etc.) can be coupled.

It will be appreciated that for simplicity and clarity of illustration, elements shown in the figures have not necessarily been drawn to scale. For example, the dimensions of some of the elements may be exaggerated relative to other elements for clarity. Referring to FIG. 4, however, server 405 is placed at a physical, or geographic, location that is the shortest distance to the location of client 430.

In one aspect, each of servers 405-420 can be configured with operational software that allows servers 405-420 to exchange resources, e.g., Web applications or components thereof, according one or more criteria including, for example, the location of one or more clients accessing the resources. In this example, client 430 is accessing Web application 205B. Accordingly, server 405 stores component 215 to provide client 430 with greater response time and performance for Web application 205B.

Component 220 of Web application 205B can be stored at a different server, e.g., server 420. Server 420, for example, can be placed at a location that is a greater distance from client 430 than server 405. Server 420 may be in a location that is less expensive to operate compared to server 405. Server 405, for example, can be located in a highly populated area whereas server 420 is not. Because server 405 does not store or host the entirety of Web application 205B, server 405 can be used to store and/or host more resources for one or more other Web applications than would have been the case had component 220 also been stored and/or hosted on server 405.

The one or more embodiments disclosed within this specification provide techniques for separating a Web application into two or more components. The components can be deployed to different servers at different locations within a network so that those resources of the Web application that are most frequently accessed or otherwise deemed required can be located closer to the client(s) accessing the Web application. Resources of the Web application not deemed required or that are accessed less frequently can be deployed to locations farther from the client thereby permitting less expensive and more efficient usage of the communication system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer hardware system, comprising:
   at least one hardware processor configured to initiate the following executable operations:
      generating a cache manifest for a Web application, the cache manifest specifying a Web page of the Web application;
      building a closure collection including a resource required by the Web page;
      writing, within the cache manifest, a reference to the resource; and
      separating the Web application into:
         a first component including the closure collection and the cache manifest and
         a second component, distinct from the first component, including a portion of the Web application not included in the first component;
   wherein a plurality of references are included within the closure collection, and a reference is written within the cache manifest for each of the plurality of resources within the closure collection.

2. The system of claim 1, wherein
a target specified by the Web page is identified as the resource.

3. The system of claim 1, wherein
the resource is a static resource.

4. The system of claim 1, wherein
each of a plurality of resources included within the closure collection is a static resource.

5. The system of claim 1, wherein
at least a portion of the closure collection is compressed.

6. The system of claim 1, wherein
the first component and the second component are separately deployed.

7. The system of claim 1, wherein
the closure collection comprises at least a first resource and a second resource, and
the first resource and the second resource are consolidated into a single, consolidated resource.

8. The system of claim 1, wherein
the cache manifest is updated based upon the consolidation of the first resource and the second resource.

9. A computer program product, comprising:
a computer readable storage medium having stored thereon program that, when executed configures a processor to perform following operations:
   generating a cache manifest for a Web application, the cache manifest specifying a Web page of the Web application;
   building a closure collection including a resource required by the Web page;
   writing, within the cache manifest, a reference to the resource; and
   separating the Web application into:
      a first component including the closure collection and the cache manifest and
      a second component, distinct from the first component, including a portion of the Web application not included in the first component;
wherein a plurality of references are included within the closure collection, and a reference is written within the cache manifest for each of the plurality of resources within the closure collection.

10. The computer program product of claim 9, wherein
a target specified by the Web page is identified as the resource.

11. The computer program product of claim 9, wherein
the resource is a static resource.

12. The computer program product of claim 9, wherein
each of a plurality of resources included within the closure collection is a static resource.

13. The computer program product of claim 9, wherein
at least a portion of the closure collection is compressed.

14. The computer program product of claim 9, wherein
the first component and the second component are separately deployed.

15. The computer program product of claim 9, wherein
the closure collection comprises at least a first resource and a second resource, and the first resource and the second resource are consolidated into a single, consolidated resource.

16. The computer program product of claim 9, wherein the cache manifest is updated based upon the consolidation of the first resource and the second resource.

\* \* \* \* \*